United States Patent [19]

Harano et al.

[11] 4,406,959

[45] Sep. 27, 1983

[54] ROTARY ELECTRIC MOTOR

[75] Inventors: Keiichi Harano, Sagamihara; Shigeki Kawada, Hino; Shigeaki Oyama, Hachioji, all of Japan

[73] Assignee: Fujitsu Fanuc Limited, Tokyo, Japan

[21] Appl. No.: 261,487

[22] Filed: May 7, 1981

[30] Foreign Application Priority Data

May 7, 1980 [JP] Japan .................................. 55-59388

[51] Int. Cl.³ .......................................... H02K 9/00
[52] U.S. Cl. ...................................... 310/58; 310/61;
310/62; 310/89; 165/104.25; 165/104.33
[58] Field of Search ....................... 310/54, 52, 64, 61,
310/58, 59, 62, 63, 86, 65, 55, 112, 88, 89, 216;
165/104.25, 104.33

[56] References Cited

U.S. PATENT DOCUMENTS

| 1,170,192 | 2/1916 | Rudenberg et al. | 310/63 |
| 2,330,121 | 9/1943 | Heintz | 310/52 |
| 3,684,906 | 8/1972 | Lenz | 310/64 |

Primary Examiner—R. Skudy
Attorney, Agent, or Firm—Armstrong, Nikaido, Marmelstein & Kubovcik

[57] ABSTRACT

A rotary electric motor of a sealed type comprising a heat pipe in a rotor shaft and a plurality of air vents in a stator. In the operation of this motor, a rotor mounted on the rotor shaft is cooled by the heat pipe and simultaneously, the stator is cooled directly by the air flowing therethrough.

6 Claims, 3 Drawing Figures

ROTARY ELECTRIC MOTOR

The present invention relates to a rotary electric motor of a sealed type and, more particularly, to the improvement of a cooling structure of a rotary electric motor of a sealed type.

In general, a rotary electric motor (hereinafter, refer to as a motor) used for machine tools is of a sealed type, in order to prevent dust, oil or the like from being introduced into the motor. In such a sealed type motor, which tends to heat up in operation, it is necessary to maintain the temperature of the motor below a certain limit, in order to prevent deterioration of the materials used in the motor; accordingly, means for cooling the motor in usually provided.

In a conventional motor, a heat pipe incorporated within a rotor shaft is commonly used for cooling a rotor. The heat pipe is constructed by forming a cavity in the rotor shaft and inserting a liquid. In the operation of the heat pipe, a quantity of the liquid located in the evaporating region, in which the temperature is relatively high, absorbs heat from the inner walls of the cavity, so that the liquid is evaporated. Then, the vapor flows to the condensing region, in which the temperature is relatively low, so that the vapor is condensed into liquid. The liquid is again returned to the evaporating region of the cavity. As a result, the entire rotor is cooled and accordingly, the entire motor is also cooled. However, this conventional motor, incorporating such a heat pipe, has an insufficient cooling effect.

It is an object of the present invention to provide a rotary electric motor of a sealed type having a sufficient cooling effect.

According to the present invention, there is provided a rotary electric motor of a sealed type, comprising: a first housing; a second housing having at least one air outlet which leads to the open air; a rotor shaft rotatably supported by the first housing, the projection of the rotor shaft located within the second housing; a rotor mounted on the rotor shaft and being sealed in said first housing; a stator fixed to the first housing and disposed around the outer circumference of the rotor; a plurality of cooling members, fixed to the projection of the rotor shaft within the second housing, for cooling the rotor shaft; a heat pipe disposed coaxially within the rotor shaft; and a plurality of air vents disposed within the stator, parallel to the longitudinal direction of the motor, and leading to the open air and to the spaces within the second housing, so that rotation of the rotor shaft moves air through the air vents. In this motor, since the stator is cooled directly by the air flowing through the air vents, the cooling effect for the entire motor is increased.

The present invention will be more clearly understood from the following description with reference to the accompanying drawings wherein.

Figure 1:
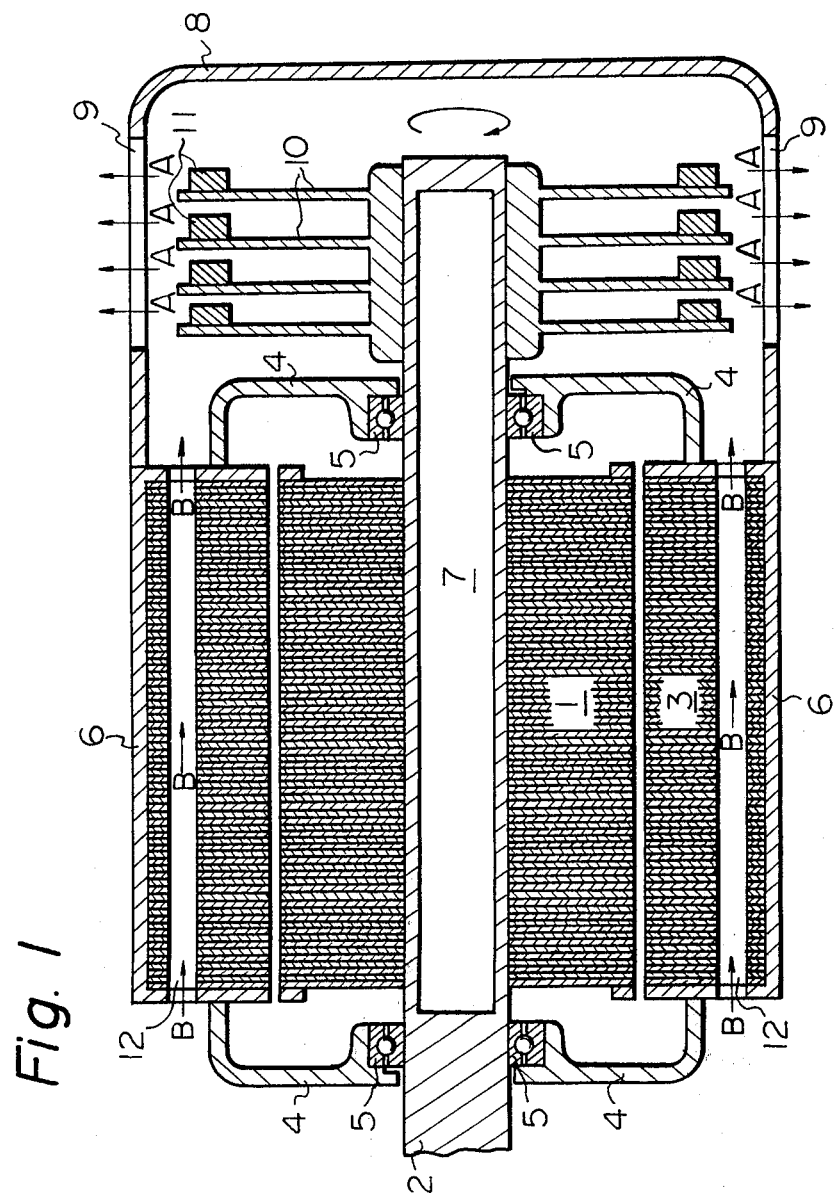
FIG. 1 is a longitudinal sectional view illustrating a first embodiment of the rotary electric motor of a sealed type according to the present invention.

In FIG. 1, which illustrates a first embodiment of the rotary electric motor according to the present invention, a rotor 1, which is comprised of a large number of laminating members, is mounted on a rotor shaft 2. In addition, a stator 3, which is also comprised of a large number of laminating members, is disposed around the outer circumference of the rotor 1. In this case, the stator 3 is fixed to a housing 4, while the rotor shaft 2 is rotatably supported by the housing 4 through bearing members 5. Reference numeral 6 indicates a stator housing or a yoke.

It should be noted that the rotor 1 is sealed in the housing 4, in other words, the spaces surrounding the rotor 1 are isolated from the open air. As a result, during the operation of the motor, dust, oil or the like is prevented from being introduced into the rotor poriton of the motor. However, in such a sealed type motor, the rotor 1 tends to heat up during operation, which also increases the temperature of the entire motor.

Next, dissipation of heat generated in the motor will be explained. For this purpose, a heat pipe 7, into which working liquid is inserted, is provided within the rotor shaft 2. The evaporating portion of the heat pipe 7 is located within the housing 4, while the condensing portion of the heat pipe 7 is located outside the housing 4, that is, within another housing 8 which has one or more air outlets 9. The projection of the rotor shaft 2 is provided with a plurality of discs 10 each having a plurality of cooling fins 11 equidistantly disposed near the circumference thereof. Therefore, when the rotor shaft 2 rotates, the cooling fins 11 also rotate, so that air flows, as indicated by the arrows A, due to centrifugal forces. As a result, the condensing portion of the heat pipe 7 within the housing 8 is cooled, and, accordingly, the rotor 1 is also cooled.

In addition, according to the present invention, a plurality of air vents 12 are provided within the stator 3 and parallel to the longitudinal direction of the motor. Therefore, the flowing of air, as indicated by the arrows A, also moves air through the air vents 12, as indicated by the arrows B. As a result, the stator 3 is cooled directly by the air.

Figure 2:
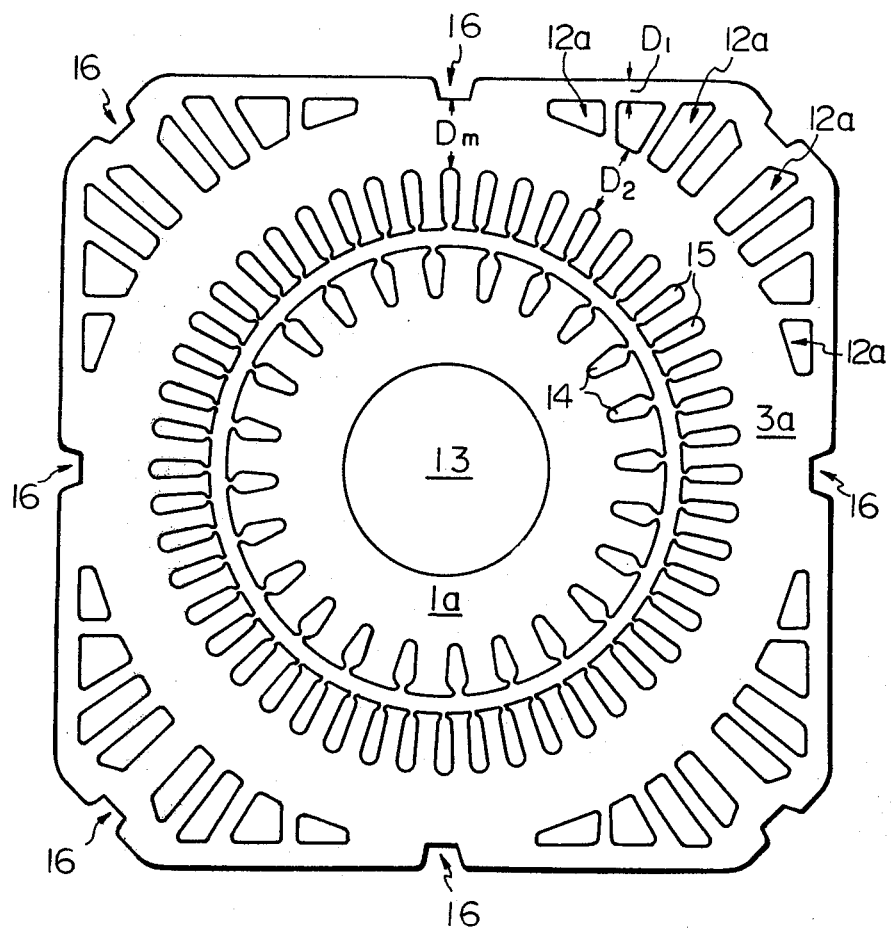
FIG. 2 is a plan view of the laminating members of the rotor 1 and the stator 3 of FIG. 1.

FIG. 2 is a plan view of the laminating members of the rotor 1 and the stator 3 of FIG. 1. In FIG. 2, $1a$ is one of the laminating members of the rotor 1, while $3a$ is one of the laminating members of the stator 3. The member $1a$ is provided with an aperture 13 for passing the rotor shaft 2 (FIG. 1) therethrough, and a pluraliy of slots 14 for windings (not shown), around the outer circumference thereof. On the other hand, the member $3a$ is provided with a plurality of slots 15 for windings (not shown), around the inner circumference thereof, and a plurality of slots 16 for steel bars, which are used for combining the laminating members, around the outer circumference thereof.

In FIG. 2, reference numeral $12a$ indicates an aperture for passing the air vent 12 of FIG. 1. Each aperture $12a$ is preferably as large as possible so as to increase the capacity of air flowing therethrough and in addition, the peripheral length is preferably as long as possible so as to increase the cooling effect for the stator 3 of FIG. 1. However, in order to maintain the strength of a magnetic circuit generated in the laminating member $3a$ by the current flowing through the windings (not shown) of the slots 15, the following condition must be satisfied:

$$D_1 + D_2 \geqq D_m$$

where $D_1$ is the distance between the outer edge of the aperture $12a$ and the outer edge of the laminating element $3a$;

$D_2$ is the distance between the inner edge of the aperture 12a and the inner edge of the laminating element 3a; and $D_m$ is the minimum distance between the outer and inner edges of the laminating element 3a.

Therefore, in order to increase the cooling effect, it is preferably that $D_1 + D_2 = D_m$.

Figure 3:
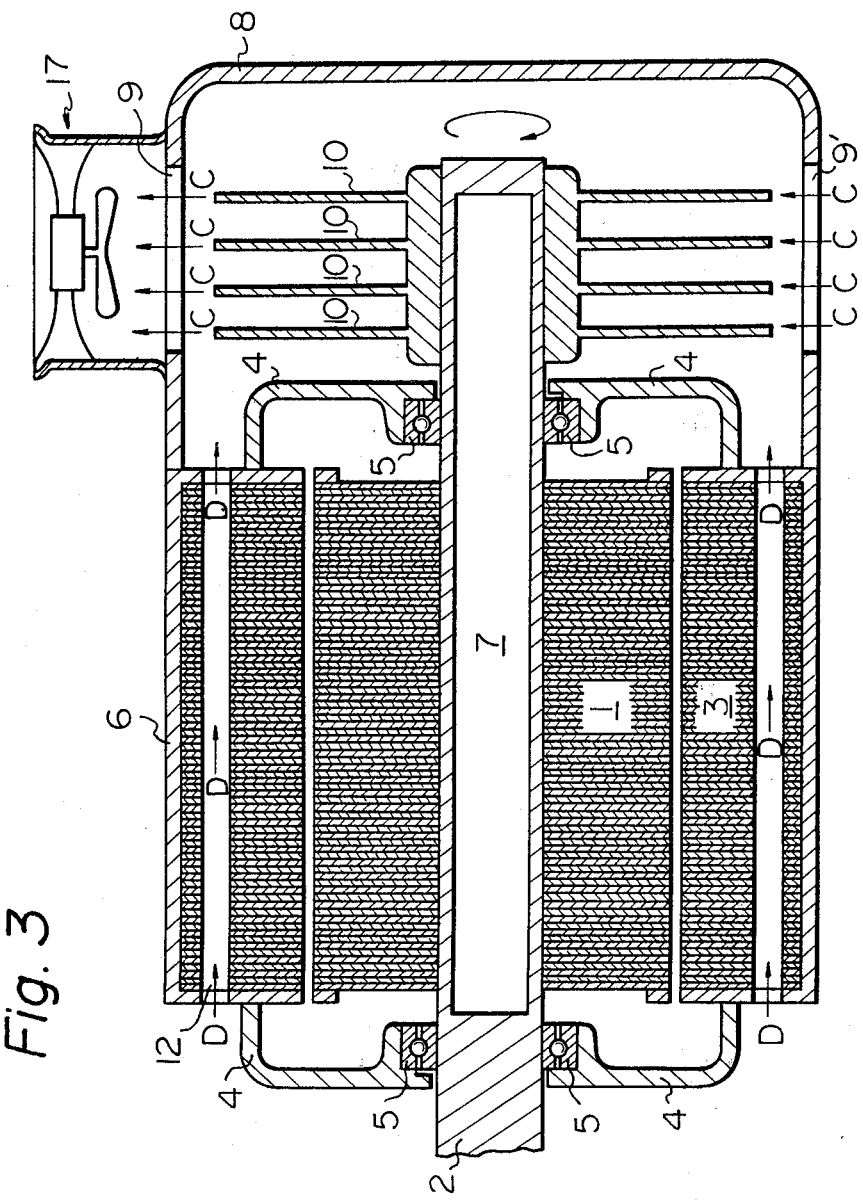
FIG. 3 is a longitudinal sectional view illustrating a second embodiment of the rotary electric motor of a sealed type according to the present invention.

FIG. 3 is a longitudinal sectional view illustrating a second embodiment of the rotary electric motor of a sealed type according to the present invention. In FIG. 3, the elements which are the same as those of FIG. 1 are denoted by the same reference numerals. However, a cooling fan 17 is provided instead of the fins 11 of FIG. 1. In addition, an aperture 9' serves as an air inlet, not as an air outlet. In FIG. 3, regardless of the operation of the rotor shaft 2, if the cooling fan 17 is operated, air flows, as indicated by the arrows C. This flowing of air invites flowing of more air, as indicated by the arrows D. Therefore, the stator 3 is cooled directly by the air. Of course, in the operation of the rotor shaft 2 the rotor 1 is cooled by the heat pipe 7.

As explained hereinbefore, the rotary electric motor has an advantage, as compared with the conventional motor, in that the cooling effect for the entire motor is increased, since the rotor is cooled by the heat pipe and simultaneously, the stator is cooled directly by the air flowing therethrough.

We claim:

1. A structure for use with a rotary electric motor of a sealed type, comprising:
    a first housing;
    a second housing having at least one air opening which leads to the outside air, said second housing being sealed from said first housing;
    a rotor shaft rotatably supported by said first housing, a projection of said rotor shaft located within said second housing;
    a rotor mounted on said rotor shaft and being sealed in said first housing;
    a stator fixed to said first housing and disposed around the outer circumference of said rotor, the space between the outer surface of said rotor and the inner surface of said stator being sealed from the outside air by said first housing;
    a plurality of air vents disposed within said stator, parallel to the longitudinal direction of said motor, and leading to the outside air and to the spaces within said second housing, wherein air flowing through said air vents does not flow into said first housing; and
    a means for forcibly moving air through passages formed by said plurality of air vents, the space within said second housing and the air opening thereof.

2. A rotary electric motor as set forth in claim 1, wherein said forcibly moving air means comprises a cooling fan fixed to said second housing near said air opening.

3. A rotary electric motor as set forth in claim 1, further comprising:
    a plurality of cooling members, fixed to the projection of said rotor shaft within said second housing, for cooling said rotor shaft; and
    a heat pipe disposed coaxially within said rotor shaft.

4. A rotary electric motor as set forth in claim 1, wherein the sum of the distance between the outer edge of said stator and the outer edge of each air vent and the distance between the inner edge of said stator and the inner edge of each air vent is substantially the same as the minimum distance between the outer and inner edges of said stator.

5. A rotary electric motor as set forth in claim 3, wherein said cooling members are discs.

6. A rotary electric motor as set forth in claim 5, wherein each of said discs has a plurality of fins equidistantly disposed near the circumference thereof.

* * * * *